United States Patent
Rubarkh et al.

(10) Patent No.: US 11,349,727 B1
(45) Date of Patent: May 31, 2022

(54) SERVICE LEVEL AGREEMENT MANAGEMENT SERVICE

(71) Applicant: AT&T Intellectual Property I, L.P., Atlanta, GA (US)

(72) Inventors: Alexander Rubarkh, Richboro, PA (US); James Gordon Beattie, Jr., Bergenfield, NJ (US); Ahmad Khan, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/317,011

(22) Filed: May 11, 2021

(51) Int. Cl.
   *H04L 41/50* (2022.01)
   *H04L 41/0631* (2022.01)
   *H04L 43/091* (2022.01)
   *H04L 41/5009* (2022.01)

(52) U.S. Cl.
   CPC ...... *H04L 41/5032* (2013.01); *H04L 41/0631* (2013.01); *H04L 41/5009* (2013.01); *H04L 41/5035* (2013.01)

(58) Field of Classification Search
   CPC ............ H04L 41/0631; H04L 41/5009; H04L 41/5032; H04L 41/5035
   USPC ...................................................... 709/224
   See application file for complete search history.

(56) References Cited

U.S. PATENT DOCUMENTS

| | | | |
|---|---|---|---|
| 7,082,463 B1 * | 7/2006 | Bradley | H04L 41/5003 709/223 |
| 7,206,771 B2 * | 4/2007 | Alvarez | G06Q 10/06 706/45 |
| 7,213,179 B2 * | 5/2007 | Song | G06F 11/008 709/224 |
| 7,218,974 B2 * | 5/2007 | Rumi | G05B 13/0275 318/561 |
| 7,500,150 B2 * | 3/2009 | Sharma | G06F 11/34 714/39 |
| 7,523,355 B2 * | 4/2009 | Huang | H04L 41/0604 714/43 |
| 7,536,370 B2 * | 5/2009 | Masurkar | G06F 11/0709 706/45 |
| 8,010,738 B1 * | 8/2011 | Chilton | G11C 16/349 711/103 |
| 8,661,130 B2 * | 2/2014 | Sonoda | H04L 67/1002 709/226 |
| 9,088,554 B1 * | 7/2015 | Karasaridis | H04L 63/08 |
| 9,143,563 B2 * | 9/2015 | Pingel | H04L 67/12 |
| 9,411,917 B2 * | 8/2016 | Gil | G06F 30/20 |
| 9,729,405 B2 * | 8/2017 | Safer | H04L 41/06 |

(Continued)

*Primary Examiner* — David P Zarka
(74) *Attorney, Agent, or Firm* — Hartman & Citrin LLC

(57) ABSTRACT

A service level agreement management service can include a computer that can obtain network data that relates to a service. The network data can represent a service level agreement associated with the service. The computer can create a failure data set and an inventory data set that can be bound to one another to obtain an intermediate data set. A data partition of the intermediate data set can be selected based on a failure root cause. A failure estimator that estimates a probability of failure over time for the service due to the failure root cause can be determined, and a best-fit probability distribution can be identified. A failure model that represents failures over time for the service due to the failure root cause can be output, and the computer can determine if the service level agreement should be updated.

20 Claims, 8 Drawing Sheets

(56) References Cited

U.S. PATENT DOCUMENTS

| | | | |
|---|---|---|---|
| 10,135,698 B2* | 11/2018 | Groenendijk | H04L 41/5009 |
| 10,742,486 B2* | 8/2020 | Mermoud | H04L 41/0672 |
| 10,972,364 B2* | 4/2021 | George | G06N 20/00 |
| 2007/0058554 A1* | 3/2007 | Benlarbi | H04L 41/145 |
| | | | 370/248 |
| 2020/0272112 A1* | 8/2020 | Carullo | G06N 20/20 |
| 2021/0019194 A1* | 1/2021 | Bahl | G06N 20/00 |
| 2021/0176142 A1* | 6/2021 | Clarke | H04L 41/5051 |
| 2021/0211347 A1* | 7/2021 | Vasseur | H04L 43/0876 |
| 2021/0240559 A1* | 8/2021 | Shetty | G06F 11/0775 |
| 2021/0303381 A1* | 9/2021 | Baldassarre | G06F 11/079 |

* cited by examiner

SERVICE LEVEL AGREEMENT MANAGEMENT SERVICE

BACKGROUND

For some network providers (e.g., carriers), service level agreements (also referred to as "SLAs") can be critical components of outsourcing and technology vendor contracts. In particular, carriers or other providers may engage vendors (or be engaged as a vendor) to provide managed services. The service level agreements can specify various aspects of these vendor relationships such as quality of service commitments, downtime limits, penalties for failing to meet service level agreement commitments, etc.

The terms of service level agreements can be renegotiated from time-to-time based on various considerations. Determining appropriate commitment levels, however, can be difficult for a number of reasons. Similarly, it may be difficult to determine what aspects of a service or architecture create exposure for such service level agreements.

SUMMARY

The present disclosure is directed to a service level agreement management service. A customer premises equipment can operate on a customer premises. The customer premises equipment can access one or more services for various functions and/or can enable a connection between the services and one or more devices located at or in proximity to a customer premises. The services can have one or more service level agreements that can define various aspects of the quality of service and/or quality of experience for the services, users of the services, or the like. A network monitor can be configured to monitor the services, the customer premises equipment, and/or the devices; or these and/or other devices on or in communication with the network can be configured to self-report performance and/or failure information to one or more entities as illustrated and described herein.

In various embodiments of the concepts and technologies disclosed herein, a service level agreement management service can operate and/or be hosted by a server computer. The service level agreement management service can be configured to obtain network data from the customer premises equipment, the service, the devices, and/or other devices and/or entities. The network data can include failure data that can describe one or more failures of these or other entities; time data describing times of failures and/or times of entity installation; service level agreement data that describes one or more service level agreements associated with the services and/or other entities; resolution data that can describe how failures have been remediated and/or resolved; other data; combinations thereof; or the like. The service level agreement management service can analyze the network data and generate, based on the network data, a failure data set and an inventory data set.

The failure data set can describe failures of entities such as services and/or devices accessing, using, or enabling use or access to, the services; and time information associated with the entities such as times between failures. The inventory data set can describe the entities and the time since installation for the entities. The service level agreement management service can be configured to horizontally bind the failure data set to the inventory data set so that each record in the resulting bound data sets will include a time value; either a time since installation (in the event of no failure) or a time between failures. The service level agreement management service can generate a failure estimator for the data set.

In some embodiments, the failure estimator can be generated for a subset of the bound data sets and can be obtained by performing a non-parametric estimation of the probability of failure over time for the data sets or subset. The service level agreement management service can also perform a fit of probability distributions to identify a best-fit probability distribution for the failure estimator. This best-fit probability distribution can be output as a failure model and/or associated parameters, in some embodiments. In some embodiments, the service level agreement management service can generate graphical representations of the failure models, for example in response to a request, to enable visual representation of the failure estimator. It should be understood that this example is illustrative, and therefore should not be construed as being limiting in any way.

The service level agreement management service also can provide the failure models to a service level agreement management entity, and the service level agreement management entity can determine if one or more service level agreements associated with the service or other entity being considered should be updated based on an anticipated failure. If a failure is determined to be imminent, the service level agreement management entity can generate one or more service level agreement updates and provide those updates to an entity for implementation (e.g., to adjust a service level agreement). In some other embodiments, the service level agreement management service can generate the service level agreement updates and provide those service level agreement updates to various entities for implementation and/or for reporting purposes. Thus, some embodiments of the concepts and technologies disclosed herein can be used to minimize risk associated with failing to meet quality of service commitments by proactively changing associated service level agreements. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include obtaining network data that can relate to a service. The network data can represent a service level agreement associated with the service. The operations further can include creating, based on the network data, a failure data set and an inventory data set, binding the failure data set to the inventory data set to obtain an intermediate data set, selecting a data partition of the intermediate data set based on a failure root cause, determining, for the data partition, a failure estimator that estimates a probability of failure over time for the service due to the failure root cause, determining, for the failure estimator, a best-fit probability distribution, outputting a failure model that represents failures over time for the service due to the failure root cause, and determining, based on the failure model, if the service level agreement should be updated.

In some embodiments, the computer-executable instructions, when executed by the processor, cause the processor to perform operations that further can include receiving, from a user device, a request for a graphical representation of the failure model; and providing, to the user device and in response to the request, the graphical representation of the failure model. In some embodiments, the computer-executable instructions, when executed by the processor, cause the processor to perform operations that further can include triggering creation of a service level agreement update and delivery of the service level agreement to the service. In some embodiments, the network data can be obtained from a network monitor that can be configured to monitor performance of the service and a customer premises equipment. In some embodiments, the failure data set can describe a failure of a component of the service and time data that can describe a time between a first failure of the service and a second failure of the service.

In some embodiments, the inventory data set can describe a component of the service and time data that can describe a time since an installation of the component of the service. In some embodiments, binding the failure data set to the inventory data set can include horizontally binding the failure data set to the inventory data set to obtain the intermediate data set having two or more records. Each of the two or more records can identify a component of the service and can specify a time value associated with the component of the service. The time value can include one of a time between failures for the component of the service or a time since installation of the component of the service.

According to another aspect of the concepts and technologies disclosed herein, a method is disclosed. The method can include obtaining, at a computer that can include a processor, network data that can relate to a service. The network data can represent a service level agreement associated with the service. The method further can include creating, by the processor and based on the network data, a failure data set and an inventory data set; binding, by the processor, the failure data set to the inventory data set to obtain an intermediate data set; selecting, by the processor, a data partition of the intermediate data set based on a failure root cause; determining, by the processor and for the data partition, a failure estimator that estimates a probability of failure over time for the service due to the failure root cause; determining, by the processor and for the failure estimator, a best-fit probability distribution; outputting, by the processor, a failure model that represents failures over time for the service due to the failure root cause; and determining, by the processor and based on the failure model, if the service level agreement should be updated.

In some embodiments, the method can further include receiving, from a user device, a request for a graphical representation of the failure model; and providing, to the user device and in response to the request, the graphical representation of the failure model. In some embodiments, the method can further include triggering creation of a service level agreement update and delivery of the service level agreement to the service. In some embodiments, the failure data set can describe a failure of a component of the service and time data that can describe a time between a first failure of the service and a second failure of the service.

In some embodiments, the inventory data set can describe a component of the service and time data that can describe a time since an installation of the component of the service. In some embodiments, binding the failure data set to the inventory data set can include horizontally binding the failure data set to the inventory data set to obtain the intermediate data set having two or more records. Each of the two or more records can identify a component of the service and can specify a time value associated with the component of the service. The time value can include one of a time between failures for the component of the service or a time since installation of the component of the service.

According to yet another aspect of the concepts and technologies disclosed herein, a computer storage medium is disclosed. The computer storage medium can store computer-executable instructions that, when executed by a processor, cause the processor to perform operations. The operations can include obtaining network data that can relate to a service. The network data can represent a service level agreement associated with the service. The operations further can include creating, based on the network data, a failure data set and an inventory data set, binding the failure data set to the inventory data set to obtain an intermediate data set, selecting a data partition of the intermediate data set based on a failure root cause, determining, for the data partition, a failure estimator that estimates a probability of failure over time for the service due to the failure root cause, determining, for the failure estimator, a best-fit probability distribution, outputting a failure model that represents failures over time for the service due to the failure root cause, and determining, based on the failure model, if the service level agreement should be updated.

In some embodiments, the computer-executable instructions, when executed by the processor, cause the processor to perform operations that further can include receiving, from a user device, a request for a graphical representation of the failure model; and providing, to the user device and in response to the request, the graphical representation of the failure model. In some embodiments, the computer-executable instructions, when executed by the processor, cause the processor to perform operations that further can include triggering creation of a service level agreement update and delivery of the service level agreement to the service. In some embodiments, the network data can be obtained from a network monitor that can be configured to monitor performance of the service and a customer premises equipment.

In some embodiments, the failure data set can describe a failure of a component of the service and time data that can describe a time between a first failure of the service and a second failure of the service. In some embodiments, the inventory data set can describe a component of the service and time data that can describe a time since an installation of the component of the service. In some embodiments, binding the failure data set to the inventory data set can include horizontally binding the failure data set to the inventory data set to obtain the intermediate data set having two or more records. Each of the two or more records can identify a component of the service and can specify a time value associated with the component of the service. The time value can include one of a time between failures for the component of the service or a time since installation of the component of the service.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
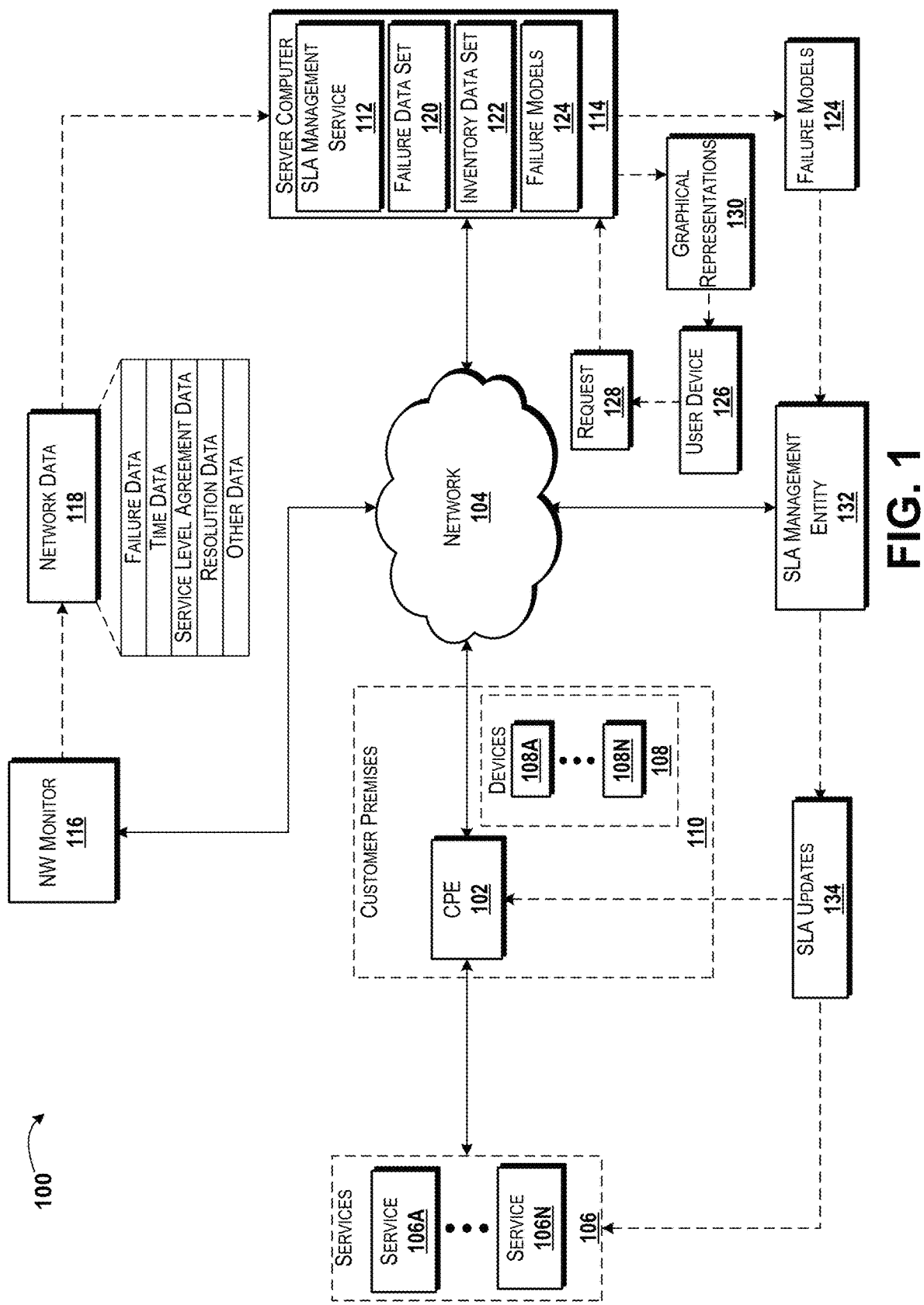
FIG. 1 is a system diagram illustrating an illustrative operating environment for various embodiments of the concepts and technologies described herein.

The following detailed description is directed to a service level agreement management service. A customer premises equipment can operate on a customer premises. The customer premises equipment can access one or more services for providing various types of functionality and/or can enable a connection between the services and one or more devices located at or in proximity to a customer premises. The services can have one or more service level agreements that can define various aspects of the quality of service and/or quality of experience for the services, users of the services, or the like. A network monitor can be configured to monitor the services, the customer premises equipment, and/or the devices; or these and/or other devices on or in communication with the network can be configured to self-report performance and/or failure information to one or more entities as illustrated and described herein.

In various embodiments of the concepts and technologies disclosed herein, a service level agreement management service can operate and/or be hosted by a server computer. The service level agreement management service can be configured to obtain network data from the customer premises equipment, the service, the devices, and/or other devices and/or entities. The network data can include failure data that can describe one or more failures of these or other entities; time data describing times of failures and/or times of entity installation; service level agreement data that describes one or more service level agreements associated with the services and/or other entities; resolution data that can describe how failures have been remediated and/or resolved; other data; combinations thereof; or the like. The service level agreement management service can analyze the network data and generate, based on the network data, a failure data set and an inventory data set.

The failure data set can describe failures of entities such as services and/or devices accessing, using, or enabling use or access to, the services; and time information associated with the entities such as times between failures. The inventory data set can describe the entities and the time since installation for the entities. The service level agreement management service can be configured to horizontally bind the failure data set to the inventory data set so that each record in the resulting bound data sets will include a time value; either a time since installation (in the event of no failure) or a time between failures. The service level agreement management service can generate a failure estimator for the data set.

In some embodiments, the failure estimator can be generated for a subset of the bound data sets and can be obtained by performing a non-parametric estimation of the probability of failure over time for the data sets or subset. The service level agreement management service can also perform a fit of probability distributions to identify a best-fit probability distribution for the failure estimator. This best-fit probability distribution can be output as a failure model and/or associated parameters, in some embodiments. In some embodiments, the service level agreement management service can generate graphical representations of the failure models, for example in response to a request, to enable visual representation of the failure estimator. It should be understood that this example is illustrative, and therefore should not be construed as being limiting in any way.

The service level agreement management service also can provide the failure models to a service level agreement management entity, and the service level agreement management entity can determine if one or more service level agreements associated with the service or other entity being considered should be updated based on an anticipated failure. If a failure is determined to be imminent, the service level agreement management entity can generate one or more service level agreement updates and provide those updates to an entity for implementation (e.g., to adjust a service level agreement). In some other embodiments, the service level agreement management service can generate the service level agreement updates and provide those service level agreement updates to various entities for implementation and/or for reporting purposes. Thus, some embodiments of the concepts and technologies disclosed herein can be used to minimize risk associated with failing to meet quality of service commitments by proactively changing associated service level agreements. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for a service level agreement management service will be described, according to an illustrative embodiment. The operating environment 100 shown in FIG. 1 includes a customer premises equipment 102 (also sometimes referred to by the acronym "CPE"). The customer premises equipment 102 can operate in communication with and/or as a part of a communications network ("network") 104, though this is not necessarily the case in all embodiments.

According to various embodiments, the functionality of the customer premises equipment 102 may be provided by one or more gateway devices, routers, server computers, desktop computers, mobile telephones, laptop computers, set-top boxes, other computing systems, and the like. It should be understood that the functionality of the customer premises equipment 102 may be provided by a single device, by two or more similar devices, and/or by two or more dissimilar devices. For purposes of describing the concepts and technologies disclosed herein, the customer premises equipment 102 is described herein as a gateway device. It should be understood that this embodiment is illustrative, and should not be construed as being limiting in any way.

According to various embodiments of the concepts and technologies disclosed herein, the customer premises equipment 102 can interact with one or more services or other resources ("services") 106A-N (hereinafter collectively and/or generically referred to as "services 106"). The services 106 can provide services to the customer premises equipment 102, and the customer premises equipment 102 can provide functionality and/or access to the services 106 to various devices 108A-N that can be located at and/or in communication proximity to customer premises 110, which can be associated with a customer or other user. Thus, it can be appreciated that the services 106 accessed by the customer premises equipment 102 can be used by the customer premises equipment 102 and/or provided to other devices 108 in communication with the customer premises equipment 102.

According to various embodiments of the concepts and technologies disclosed herein, the customer premises equipment 102 and/or the devices 108 in communication with the customer premises equipment 102, can have service level agreements (also sometimes abbreviated as "SLAs") for the services 106 accessed by the customer premises equipment 102. As is generally understood, service level agreements can set and/or specify various aspects of interactions with and/or use of the services 106 such as, for example, quality of service ("QoS") commitments for the services 106 to provide to users and/or to the customer premises equipment 102; metrics and/or parameters by which the quality of service associated with the services 106 will be measured (e.g., availability of a system, the service 106, resources, or other entities; an expected or known time-to-resolve for a detected failure; a not-to-exceed number of incidents for a particular service 106, device, entity, or the like); priorities and/or priority levels associated with the services 106; other terms associated with use of the service 106 (e.g., duration of the agreements, etc.); and/or other terms as is generally understood.

According to various embodiments of the concepts and technologies disclosed herein, the service level agreement management service 112 can be configured to manage the service level agreements associated with the services 106. In particular, the service level agreement management service 112 can be configured to collect information relating to the services 106, the service level agreements used to provide functionality associated with the services 106 to the customer premises equipment 102, and performance of the services 106 and/or the customer premises equipment 102 to determine if any changes should be made to the service level agreements. The functionality of the service level agreement management service 112 for managing service level agreements will be explained in more detail below after introducing additional elements of the operating environment 100.

In some embodiments of the concepts and technologies disclosed herein, the service level agreement management service 112 can be hosted and/or executed by a device such as, for example, a server computer 114. According to various embodiments, the functionality of the server computer 114 may be provided by one or more server computers, application servers, web servers, cloud computing devices, desktop computers, other computing systems, and the like. It should be understood that the functionality of the server computer 114 may be provided by a single device, by two or more similar devices, and/or by two or more dissimilar devices. For purposes of describing the concepts and technologies disclosed herein, the server computer 114 is described herein as an application computer. It should be understood that this embodiment is illustrative, and should not be construed as being limiting in any way.

The server computer 114 can operate in communication with and/or as a part of the network 104. As will be explained in more detail below, the network 104 can correspond to and/or can be associated with a carrier network, so the service level agreement management service 112 can be used, in some embodiments, to manage service level agreements associated with the services 106 and/or the customer premises equipment 102. It should be understood that this example is illustrative, and therefore should not be construed as being limiting in any way.

In some embodiments, the server computer 114 can execute an operating system (not illustrated in FIG. 1) and one or more application programs such as, for example, a service level agreement management service 112. The operating system can include a computer program that can control the operation of the customer premises equipment 102. The service level agreement management service 112 can include an executable program that can be configured to execute on top of the operating system to provide various functions as illustrated and described herein for managing service level agreements using a service level agreement management service 112.

In particular, the service level agreement management service 112 can be configured to obtain, from a network monitor 116, network data 118. The network data 118 can include various information and/or other types of data that can relate to performance of one or more of the services 106, devices hosting and/or providing the services 106, the customer premises equipment 102, the network 104, devices operating on and/or in communication with the network 104, and/or other devices or entities. According to various embodiments of the concepts and technologies disclosed herein, the network data 118 can include failure data, time data, service level agreement data, resolution data, other data, and/or other information and/or data.

The failure data can include information that can indicate and/or describe one or more failures of the services 106; devices or resources that host and/or execute the services 106; the network 104; devices associated with the network 104; the customer premises equipment 102; and/or other entities. The failures data can indicate a type of failure experienced and/or detected, a severity of the failure (e.g., whether the failure affected one function of a service 106, affected all functions of the service 106, took the service 106 offline, etc.); an impact of the failure (e.g., how many users, customer premises equipment, and/or devices 108 were affected; a geographic scope of the failure; etc.); and/or other aspects of the failure that can be used to understand the failure and its impact.

With regard to severity of the failures, the concepts and technologies disclosed herein can rely on various definitions of severity. For example, in some embodiments of the concepts and technologies disclosed herein, the severity of failures can be defined by one or more levels. In some embodiments of the concepts and technologies disclosed herein, subsets of failures can be generated, for example, based on severity of the failures. In some contemplated embodiments, severity of failures can range from a value of one to four. In some embodiments, a severity of level one can indicate a critical problem with an application, service (e.g., the service 106), or network (e.g., the network 104), in which an incident stops the customer or user from functioning because the application, service (e.g., the service 106), or network (e.g., the network 104) may be unusable and/or because the customer or user is otherwise unable to work. In a level one severity incident, no bypass or recovery may be possible. It should be understood that this example is illustrative, and therefore should not be construed as being limiting in any way.

In some embodiments, a severity of level two can indicate a major problem with an application, service (e.g., the service 106), or network (e.g., the network 104) in which an impact of the incident on the customer business can be limited, but may not be prevented altogether. For example, the customer or user may have an alternative way to execute their business without the application, service (e.g., the service 106), or network (e.g., the network 104); or the customer or user may suffer from performance issues that do not render the application, service (e.g., the service 106), or network (e.g., the network 104) entirely unusable. Thus, in the level two severity incident, a bypass, recovery, or repair for the application, service (e.g., the service 106), or network (e.g., the network 104) may be possible. It should be understood that this example is illustrative, and therefore should not be construed as being limiting in any way.

In some embodiments, a severity of level three can indicate a minor problem with an application, service (e.g., the service 106), or network (e.g., the network 104) in which an impact of the incident on the customer business may be minimal and it may not be necessary for the customer or user to have an alternative way to execute their business process without the application, service (e.g., the service 106), or network (e.g., the network 104). In a level three severity incident, however, the current state and/or situation may not conform to the expectations of the customer or user. It should be understood that this example is illustrative, and therefore should not be construed as being limiting in any way.

In some embodiments, a severity of level four can indicate that there is no problem with an application, service (e.g., the service 106), or network (e.g., the network 104). Thus, a level four severity incident may indicate a call or other request for service information and/or a call or other communication used to provide a suggestion. It should be understood that this example is illustrative, and therefore should not be construed as being limiting in any way. In some embodiments of the concepts and technologies disclosed herein, only failures that are of a severity level of one or two may be considered. It should be understood that this example is illustrative, and therefore should not be construed as being limiting in any way.

The time data can include data and/or other information that can be used to determine time information associated with one or more failures, one or more services 106, and/or one or more devices or other entities associated with one or more services 106. For example, in some embodiments the time data can indicate and/or can specify a time between failures ("TBF"), which can be defined for one or more service(s) 106 and/or for one or more device(s) executing and/or hosting the one or more service(s) 106. The time between failures can correspond to an amount of time that lapses from a first failure of a service 106, a device hosting a service 106, and/or other devices or entities until a second failure of a service 106, a device hosting a service 106, and/or other devices or entities. It should be understood that this example is illustrative, and therefore should not be construed as being limiting in any way.

In some other embodiments, the time data can indicate and/or can specify a time since installation ("TSI") for a particular service 106, for a device hosting and/or executing a service 106, for the customer premises equipment 102, for the one or more devices 108, and/or for other entities. In particular, the time since installation may be used for services 106 that have not yet failed, in some embodiments, for example to track the amount of time the service 106 has been available and/or has been use. The time since installation information can be useful, for example, to project or predict a failure of a service 106, a device and/or entity hosting a service 106, or the like. Because the time between failures and/or time since installation can be used for additional and/or alternative reasons, it should be understood that the above example uses are illustrative, and therefore should not be construed as being limiting in any way.

The service level agreement data can include data and/or other information that can describe service level agreements for one or more of the services 106 and/or one or more customers, users, and/or other entities provided with functionality by the services 106 (e.g., the devices 108). Thus, the service level agreement data can describe, among other things, a quality of service defined for a particular service 106 and/or user of the service 106; one or more standards, metrics, and/or parameters (e.g., availability of a system, the service 106, resources, or other entities; an expected or known time-to-resolve for a detected failure; a not-to-exceed number of incidents for a particular service 106, device, entity, or the like) that may be used to measure quality of service and/or other aspects of performance (e.g., to determine if the quality of service set by the service level agreement is met by the service 106); priorities and/or priority levels associated with the services 106 and/or users of the services 106; other terms associated with use of the service 106 (e.g., duration of the agreements, etc.); and/or other terms as is generally understood. Thus, the service level agreement data can be used to understand the contours of one or more service level agreements for one or more services 106 and/or one or more components of the one or more services 106. Because other aspects of service level agreements may be defined by service level agreement data, it should be understood that the above examples are illustrative, and therefore should not be construed as being limiting in any way.

The resolution data can describe, for a particular failure, device, service level agreement, or other entity, a resolution for the failure. The resolution data can include trouble ticket information, downtime information, and/or other information that can be used to determine how a failure was remedied, how long the remediation took, whether the remediation was in stages, entities that remedied the failure, combinations thereof, or the like. Thus, the resolution data can be used to understand how a failure is resolved, timeframes for such resolutions, entities involved in such resolutions, combinations thereof, or the like.

The other data can include various other information that can be used to understand the services 106, use of the services 106, users of the services 106, etc. Thus, the other data can include location information (e.g., for resources that provide the services 106, for users of the services 106, etc.), vendor information, carrier information, network requirements for services 106, etc. As such, the other data can include any information that may be used by the service level agreement management service 112 as illustrated and described herein that is not separately defined herein.

Because the other data can include additional information not explicitly illustrated and described herein, it should be understood that the illustrated embodiments of the other data are illustrative and should not be construed as being limiting in any way.

The service level agreement management service 112 can be configured to obtain the network data 118. In some embodiments, the service level agreement management service 112 can obtain the network data 118 from the network monitor 116, as explained above. In some other embodiments, the network data 118 can be provided to the server computer 114 (and the service level agreement management service 112) by the customer premises equipment 102, by the network 104 and/or other devices or entities on the network 104, by the services 106, by one or more of the devices 108, and/or by other entities. The example embodiment, wherein the network data 118 is provided by the network monitor 116, is illustrative and should not be construed as being limiting in any way.

The service level agreement management service 112 can be configured to obtain the network data 118 and to determine, based on an analysis of the network data 118, information relating to the services 106 such as, for example, one or more failures associated with the services 106 (if any); times at which the failures occurred (if any); times since installation for the services 106 and/or components thereof; service level agreements associated with the services 106 and/or users of the services 106; locations of services 106 and/or users of the services 106; combinations thereof; or the like. According to various embodiments of the concepts and technologies disclosed herein, the service level agreement management service 112 can be configured to create a device failure data set ("failure data set") 120 based on the network data 118.

According to various embodiments of the concepts and technologies disclosed herein, the failure data set 120 can describe failures associated with the services 106 and a time between failures metric defined for each service 106 that has failed. Thus, for example, the failure data set 120 can define a first service 106A, a first time between failures defined for the first service 106A, a second service 106B, a second time between failures defined for the second service 106B, etc. It can be appreciated that in order to create the time between failures metric, the service level agreement management service 112 may identify at least two failures of a particular service 106 (e.g., based on the failure data in the network data 118) and determine a time between the two failures (e.g., based on the time data in the network data 118). It should be understood that this example is illustrative, and therefore should not be construed as being limiting in any way.

The service level agreement management service 112 can be configured to determine, for one or more or even all services 106, a time between failures metric. Thus, it can be appreciated that the failure data set 120 can represent one service 106, more than one service 106, and/or all services 106 and a respective time between failures metric for any of the services 106 that have experienced at least two failures. It should be understood that this example is illustrative, and therefore should not be construed as being limiting in any way.

The service level agreement management service 112 also can be configured to generate, based on the network data 118, an inventory data set 122 that can define a service inventory; times at which each of the services 106 (and/or devices that provide the services 106) were initiated or brought online; combinations thereof; or the like. Thus, it can be appreciated that each entry in the inventory data set 122 can include a time since installation metric, which can define a time that has lapsed since the service 106 or device providing the service 106 was activated or otherwise initiated. Thus, for services 106 that have not failed, the time since installation metric can be determined and stored (e.g., based on the time data of the network data 118). It should be understood that this example is illustrative, and therefore should not be construed as being limiting in any way.

The service level agreement management service 112 can be configured to bind the failure data set 120 to the inventory data set 122. In particular, the failure data set 120 and the inventory data set 122 can include records that can be bound to each other horizontally, which means herein that a row of data in the resulting data set (e.g., the data set that results from binding the failure data set 120 to the inventory data set 122) can have failure data and either a time between failures or a time since installation. Thus, it can be appreciated at the data set that results from the binding of the failure data set 120 to the inventory data set 122 can include failure data and time data associated with the failure data. This resulting data set is not separately illustrated in FIG. 1, as this data set is an intermediate data set in the creation of a model that can describe failures and their associated time data, as will be explained momentarily.

The service level agreement management service 112 can be configured to generate, based on the intermediate data set (which as noted above is created by the horizontal binding of the failure data set 120 to the inventory data set 122), one or more failure models 124. The failure models 124 can be generated by the service level agreement management service 112 by applying various statistical operations on the intermediate data set.

In some embodiments of the concepts and technologies disclosed herein, the intermediate data set that can be obtained according to embodiments of the concepts and technologies disclosed herein can include a data table or other data structure. An example data structure is set forth below in TABLE 1. The example data shown in TABLE 1 shows a ticket column indicating ticket identifiers for tickets received for failures, asset identifiers, a time to resolution (labeled "TTR") for the failures; a root cause indicator column, a severity (labeled "SVR") column that can list a severity of the failures (as explained in more detail below); a time since installation (labeled "TSI") column; a time between failures (labeled "TBF") column, and a censor column. In the censor column, a value of 1 can indicate a failure of the corresponding asset (in that record), and a value of 0 can indicate that no failure has yet occurred for the associated asset. Thus, in some embodiments, the censor column can be used to identify devices that have or have not experienced a failure. Because additional and/or alternative data can be included in the intermediate data set and/or other data sets as illustrated and described herein, it should be understood that this example is merely illustrative and should not be construed as being limiting in any way. Additionally, it can be appreciated that the sample size and/or time duration for the data in the intermediate data set and/or other data and/or data sets illustrated and described herein can be set to ensure an accurate determination of the statistical model as illustrated and described herein. In one contemplated embodiment of the concepts and technologies disclosed herein, the sample size can be set to five hundred qualified failures (of a severity level of one or two as illustrated and described herein in more detail below) and six thousand five hundred devices in inventory without a failure over twenty-five months of observation. It should be

TABLE 1

| Ticket | Asset | TTR | Root Cause | ... | SVR | ... | TSI | TBF | Censor |
|---|---|---|---|---|---|---|---|---|---|
| T_ID1 | A_ID1 | 50790 | Application Error | | 1 | | TSI_1 | 13008 | 1 |
| T_ID2 | A_ID2 | 1117 | Circuit Outage | | 1 | | TSI_2 | 72 | 1 |
| T_ID3 | A_ID3 | 553 | Circuit Outage | | 1 | | TSI_3 | 12096 | 1 |
| T_ID4 | A_ID4 | 9945 | Hardware Failure | | 1 | | TSI_4 | 7752 | 1 |
| T_ID5 | A_ID5 | 50668 | Configuration | | 1 | | TSI_5 | 2424 | 1 |
| T_ID6 | A_ID6 | 2 | Software Failure | | 1 | | TSI_6 | 4776 | 1 |
| | A_ID7 | | | | | | TSI_7 | | 0 |
| | A_ID8 | | | | | | TSI_8 | | 0 |
| | A_ID9 | | | | | | TSI_9 | | 0 |
| | A_ID10 | | | | | | TSI_10 | | 0 |
| | A_ID11 | | | | | | TSI_11 | | 0 |
| | A_ID12 | | | | | | TSI_12 | | 0 |
| | A_ID13 | | | | | | TSI_13 | | 0 | understood that this example is illustrative, and therefore should not be construed as being limiting in any way.

In particular, in some embodiments of the concepts and technologies disclosed herein, the service level agreement management service 112 can be configured to generate the failure models 124 by generating an estimated time to failure or between failures for a service 106, device, or other entity, and fitting one or more probability distributions to the estimate to identify a best-fit distribution. In particular, in some embodiments, the service level agreement management service 112 can be configured to perform, on the intermedia data set (based on the failure data set 120 and the inventory data set 122), a non-parametric estimation of the probability of a failure over time for a particular service 106, device hosting a service 106, customer premises equipment 102, devices 108, and/or other devices as illustrated and described herein.

According to one example embodiment, the service level agreement management service 112 can apply, to the intermediate data set (which as noted above is created by the horizontal binding of the failure data set 120 to the inventory data set 122), a Kaplan-Meier estimator (also sometimes referred to a "Kaplan-Meier estimate") or other type of survival analysis, to generate an estimator of the probability of failure over time. In some embodiments, the Kaplan-Meier estimator (also referred to as a product limit estimator) can be used to generate a "lifetime" estimator (hereinafter a "failure estimator" or "device survival function"), which in the context of the concepts and technologies disclosed herein, can be a "lifetime" of a service 106, device, or other entity from installation to failure, or from a failure to a subsequent failure. Thus, the failure estimator can indicate a runtime to or between failures from, respectively, installation or failure to failure. Because other statistical analysis can be used to determine the time to failure (e.g., lifetime) estimator, it should be understood that this example is illustrative, and therefore should not be construed as being limiting in any way.

The service level agreement management service 112 can also be configured to identify a statistical distribution that can represent the failure estimator. According to some embodiments of the concepts and technologies disclosed herein, the service level agreement management service 112 can be configured to perform a fit of probability distributions to the failure estimator, and to select a best-fit distribution (based on metrics of the failure estimator) and associated parameters for the best-fit distribution (e.g., parameters that can relate to the type of device, the utilization and/or other use characteristics of the device, combinations thereof, or the like). The resulting probability distribution and parameters can model the failures of the services 106, devices hosting the services 106, and/or other entities; as observed (e.g., in the failure data set 120) and/or as projected (e.g., based on the failure data set 120 and/or the inventory data set 122), and therefore can be output as the failure models 124. It should be understood that this example is illustrative, and therefore should not be construed as being limiting in any way.

In some embodiments, as shown in FIG. 1, a user device 126 can communicate with the server computer 114 (and the service level agreement management service 112), e.g., via a portal or application programming interface exposed by the server computer 114, or the like. The user device 126 can be configured to generate a request 128 for a representation of the failure models 124, and the service level agreement management service 112 can be configured to provide, to the user device 126, one or more graphical representations 130. The graphical representations 130 can include display data that, when rendered by the user device 126 and/or presented in a web page, portal, or the like; can represent the failure models 124. Some example graphical representations 130 are illustrated and described herein with reference to FIGS. 3A-3C. Because other types of graphical representations 130 can be generated in accordance with the concepts and technologies disclosed herein, it should be understood that these examples are illustrative, and therefore should not be construed as being limiting in any way.

The service level agreement management service 112 can also be configured to send, to a service level agreement management entity 132, the failure models 124 and/or information for one or more changes that should be made to a service level agreement such as, for example, one or more updates to the service level agreements. The service level agreement management entity 132 can operate on or in communication with the network 104 and can be responsible, in some embodiments, for the management of service level agreements for the services 106 and/or users of the services 106. In some embodiments, the service level agreement management service 112 can be configured to perform the functionality of the service level agreement management entity 132, and the service level agreement management entity 132 can therefore be omitted in various embodiments of the concepts and technologies disclosed herein. It should be understood that this example is illustrative, and therefore should not be construed as being limiting in any way.

The service level agreement management entity 132 can be configured to receive the failure models 124, and to generate, based on the failure models 124, one or more service level agreement updates 134. The service level agreement updates 134 can include commands, instructions, and/or other code for causing a recipient to modify a service level agreement associated with a service 106, device, or the like. According to various embodiments of the concepts and technologies disclosed herein, the service level agreement updates 134 can be received by the customer premises equipment 102 and/or one or more of the services 106, and a service level agreement associated with the one or more services 106 can be modified based on the service level agreement updates 134. Thus, for example, if a failure model 124 indicates that a particular service 106 is likely to fail at a particular time, the service level agreement management service 112 can be configured to modify the service level agreement associated with the service 106 before the expected time of the failure, thereby avoiding a failure to meet a quality of service or other metric associated with the service level agreement for that service 106. In some embodiments, the service level agreement updates 134 can include suggestions for a next revision of the applicable service level agreement, and therefore is not immediately implemented. It should be understood that this example is illustrative, and therefore should not be construed as being limiting in any way.

Although the example embodiment illustrated in FIG. 1 shows the server computer 114 sending the failure models 124 to the service level agreement management entity 132, and the service level agreement management entity 132 generating the service level agreement updates 134 for providing to the services 106 and/or customer premises equipment 102, it should be understood that this example is illustrative. In particular, some embodiments of the concepts and technologies disclosed herein include the service level agreement management service 112 generating service level agreement updates 134 and sending those directly to the services 106 and/or the customer premises equipment 102. As such, the illustrated embodiment is illustrative and should not be construed as being limiting in any way.

According to various embodiments of the concepts and technologies disclosed herein, the service level agreement management service 112 can be configured to generate failure models 124 for one or more service 106, devices associated with the service 106, other devices such as the customer premises equipment 102 and/or the devices 108, and the like. In some embodiments, a failure model 124 can be generated for specific failure root causes, thereby enabling specific root causes to be analyzed and/or to enable analysis of certain hardware (e.g., the customer premises equipment 102). Thus, failure models 124 can be generated for all devices and/or other entities associated with a service 106 and/or all services 106 associated with a particular customer premises equipment 102, thereby enabling the creation of a failure profile for the service 106 (across users) and/or a customer premises equipment 102 (across services 106). It should be understood that these example embodiments are illustrative, and therefore should not be construed as being limiting in any way.

In practice, a customer premises equipment 102 can operate on a customer premises. The customer premises equipment 102 can access one or more services 106 for providing various types of functionality and/or can enable a connection between the services 106 and one or more devices located at or in proximity to a customer premises 110. The services 106 can have one or more service level agreements that can define various aspects of the quality of service and/or quality of experience for the services 106, users of the services 106, or the like. A network monitor 116 can be configured to monitor the services 106, the customer premises equipment 102, and/or the devices 108; or these and/or other devices on or in communication with the network 104 can be configured to self-report performance and/or failure information to one or more entities as illustrated and described herein.

In various embodiments of the concepts and technologies disclosed herein, a service level agreement management service 112 can operate and/or be hosted by a server computer 114. The service level agreement management service 112 can be configured to obtain network data 118 from the customer premises equipment 102, the service 106, the devices 108, and/or other devices and/or entities. The network data 118 can include failure data that can describe one or more failures of these or other entities; time data describing times of failures and/or times of entity installation; service level agreement data that describes one or more service level agreements associated with the services and/or other entities; resolution data that can describe how failures have been remediated and/or resolved; other data; combinations thereof; or the like. The service level agreement management service 112 can analyze the network data 118 and generate, based on the network data 118, a failure data set 120 and an inventory data set 122.

The failure data set 120 can describe failures of entities such as services 106 and/or devices accessing, using, or enabling use or access to, the services 106; and time information associated with the entities such as times between failures. The inventory data set 122 can describe the entities and the time since installation for the entities. The service level agreement management service 112 can be configured to horizontally bind the failure data set 120 to the inventory data set 122 so that each record in the resulting bound data sets will include a time value; either a time since installation (in the event of no failure) or a time between failures. The service level agreement management service 112 can generate a failure estimator for the data set.

In some embodiments, the failure estimator can be generated for a subset of the bound data sets and can be obtained by performing a non-parametric estimation of the probability of failure over time for the data sets or subset. The service level agreement management service 112 can also perform a fit of probability distributions to identify a best-fit probability distribution for the failure estimator. This best-fit probability distribution can be output as a failure model 124 and/or associated parameters, in some embodiments. In some embodiments, the service level agreement management service 112 can generate graphical representations of the failure models 124, for example in response to a request 128, to enable visual representation of the failure estimator. It should be understood that this example is illustrative, and therefore should not be construed as being limiting in any way.

The service level agreement management service 112 also can provide the failure models 124 to a service level agreement management entity 132, and the service level agreement management entity 132 can determine if one or more service level agreements associated with the service 106 or other entity being considered should be updated based on an anticipated failure. If a failure is determined to be imminent, the service level agreement management entity 132 can generate one or more service level agreement updates 134 and provide those updates to an entity for implementation (e.g., to adjust an service level agreement). In some other embodiments, the service level agreement management service 112 can generate the service level agreement updates 134 and provide those service level agreement updates 134 to various entities for implementation and/or for reporting purposes. Thus, some embodiments of the concepts and technologies disclosed herein can be used to minimize risk associated with failing to meet quality of service commitments by proactively changing associated service level agreements. It should be understood that this example is illustrative, and therefore should not be construed as being limiting in any way.

FIG. 1 illustrates one customer premises equipment 102, one network 104, two services 106, two devices 108, one customer premises 110, one server computer 114, one network monitor 116, and one service level agreement management entity 132. It should be understood, however, that various implementations of the operating environment 100 can include zero, one, or more than one customer premises equipment 102; zero, one, or more than one network 104; one, two, or more than two services 106; zero, one, two, or more than two devices 108; zero, one, or more than one customer premises 110; zero, one, or more than one server computer 114; zero, one, or more than one network monitor 116; and/or zero, one, or more than one service level agreement management entity 132. As such, the illustrated embodiment should be understood as being illustrative, and should not be construed as being limiting in any way.

Figure 2:
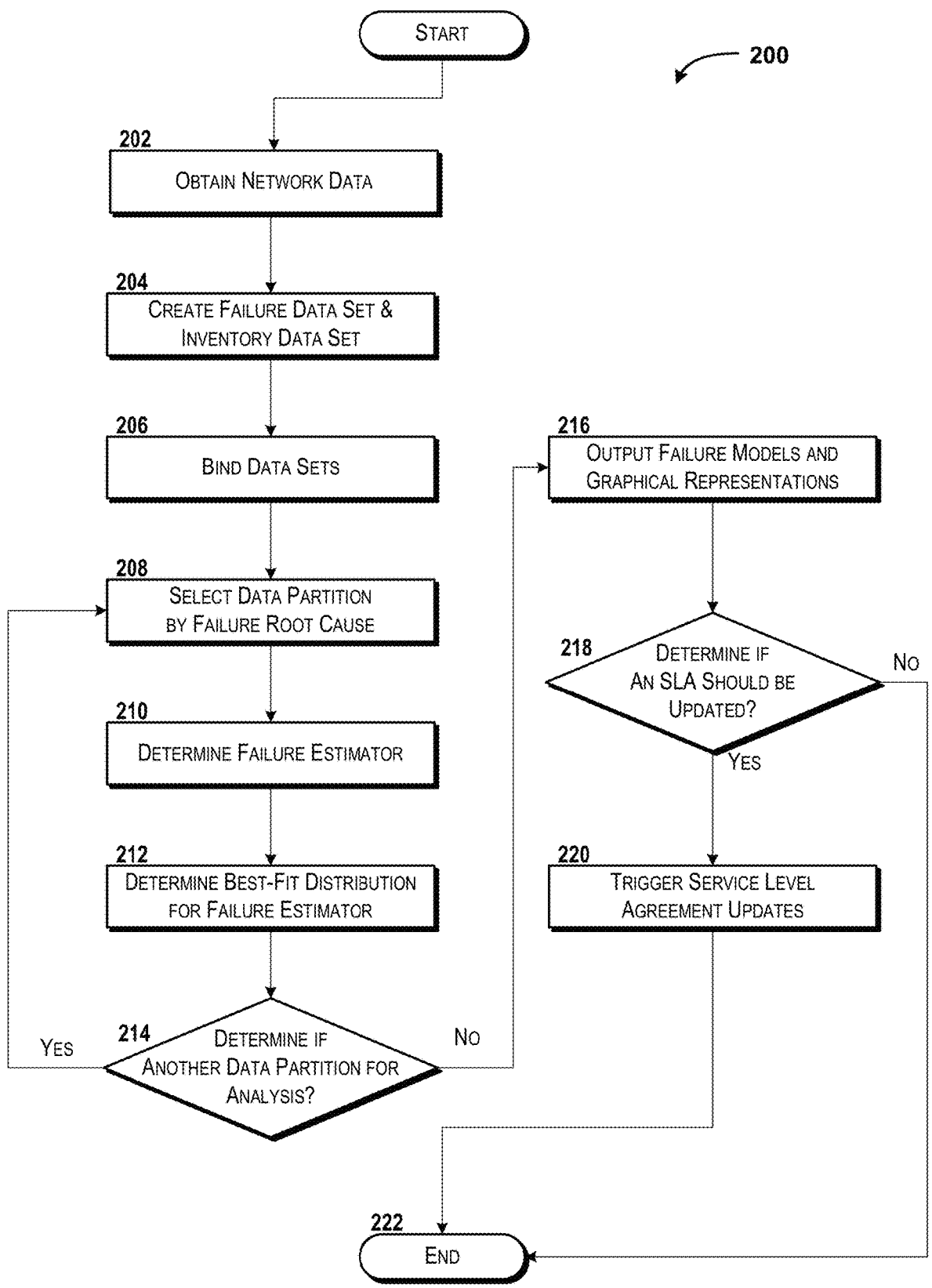
FIG. 2 is a flow diagram showing aspects of a method for managing service level agreements using a service level agreement management service, according to an illustrative embodiment of the concepts and technologies described herein.

Turning now to FIG. 2, aspects of a method 200 for managing service level agreements using a service level agreement management service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 114, to perform one or more operations and/or causing the processor to direct other components of the computing system or device to perform one or more of the operations.

For purposes of illustrating and describing the concepts of the present disclosure, the method 200 is described herein as being performed by the server computer 114 via execution of one or more software modules such as, for example, the service level agreement management service 112. It should be understood that additional and/or alternative devices and/or network nodes can provide the functionality described herein via execution of one or more modules, applications, and/or other software including, but not limited to, the service level agreement management service 112. Thus, the illustrated embodiments are illustrative, and should not be viewed as being limiting in any way.

The method 200 begins at operation 202. At operation 202, the server computer 114 can obtain network data such as the network data 118 illustrated and described with reference to FIG. 1. As explained herein, the network data 118 can be provided to the service level agreement management service 112 (or the server computer 114 that hosts the service level agreement management service 112), in some embodiments, by the network monitor 116. In some embodiments, the network data 118 can be provided to the server computer 114 and/or the service level agreement management service 112 by one or more services 106.

In yet other embodiments of the concepts and technologies disclosed herein, the network data 118 can be provided to the server computer 114 and/or the service level agreement management service 112 by the customer premises equipment 102 and/or one or more of the devices 108. Thus, it can be appreciated that one or more entities can provide the network data 118 to the server computer 114 and/or the service level agreement management service 112 in accordance with various embodiments of the concepts and technologies disclosed herein. Because the network data 118 can be obtained by the server computer 114 in a variety of manners, it should be understood that these examples are illustrative, and therefore should not be construed as being limiting in any way.

From operation 202, the method 200 can proceed to operation 204. At operation 204, the server computer 114 can create a failure data set 120 and an inventory data set 122. In particular, as noted above, the server computer 114 can generate the failure data set 120 and the inventory data set 122 based on the network data 118. In various embodiments, as explained in detail above, then network data 118 can include failure data, time data, service level agreement data, resolution data, other data, and the like. Thus, in operation 204, the server computer 114 can generate, based on the network data 118, a failure data set 120 that can represent failures and times between failures.

The server computer 114 also can generate, based on the network data 118, an inventory data set 122 that can represent services 106 and/or components thereof (e.g., resources that host services 106, users of services 106, network resources associated with services 106, combinations thereof, or the like) and a time since installation for each of the services 106 and/or components thereof. As such, as explained herein, the failure data set 120 and the inventory data set 122 can define, for a service 106, device associated with and/or using the service 106, and/or components thereof failure information, time information associated with failures, and/or a time since initialization of the service 106, device associated with and/or using the service, and/or components thereof.

From operation 204, the method 200 can proceed to operation 206. At operation 206, the server computer 114 can bind the failure data set 120 to the inventory data set 122. As noted above, the binding can correspond to a horizontal binding of the data sets such that each row in the resulting bound data set can include a time between failures and/or a time since installation. Thus, it can be appreciated that each record in the bound data sets in various embodiments can include a time parameter. It should be understood that this example is illustrative, and therefore should not be construed as being limiting in any way.

From operation 206, the method 200 can proceed to operation 208. At operation 208, the server computer 114 can select a data partition by failure root cause. In particular, as noted above the server computer 114 can be configured to generate an intermediate data set in some embodiments by binding the failure data set 120 to the inventory data set 122, and in operation 208 the server computer 114 can be configured to select filter the intermediate data set based on a particular root cause. For example, a processing resource failure can be used as a root cause filter on the intermediate data set (or on the bound data sets) to identify all failures associated with that particular root cause. Operations 208-214 can be iterated on the sub-set of data from this filtered intermediate data set to model failures associated with that specific root cause, as will be explained in more detail.

From operation 208, the method 200 can proceed to operation 210. At operation 210, the server computer 114 can determine a failure estimator for the sub-set of data as selected in operation 208 (e.g., for the currently-considered root cause). As explained above, the failure estimator determined in operation 210 can correspond to a non-parametric estimation of a probability of failure over time for a particular entity such as, for example, a service 106, a device hosting a service 106, a device accessing or using the service 106, a device enabling access or use of the service 106 such as the customer premises equipment 102, devices accessing the service 106 such as the devices 108, combinations thereof, or the like. Furthermore, as is clear from FIG. 2, the failure estimator determined in operation 210 can be determined for the selected root cause, as the data used to generate the failure estimator in operation 210 can be a sub-set of the bound failure data set 120 and inventory data set 122. It should be understood that this example is illustrative, and therefore should not be construed as being limiting in any way.

Thus, in operation 210 a failure estimator can be generated for one or more entities as represented by the network data 118. In some example embodiments, a failure estimator can be generated in operation 210 for the customer premises equipment 102 (e.g., a failure estimator for the customer premises equipment 102 across multiple services 106), a service 106 (e.g., a failure estimator for a particular service 106 across multiple users such as, for example, the customer premises equipment 102), other devices and/or entities, combinations thereof, or the like; for a selected root cause. It should be understood that this example is illustrative, and therefore should not be construed as being limiting in any way.

As noted above, the failure estimator can be generated, in some embodiments, the server computer 114 applying, to the bound data sets, a Kaplan-Meier estimate to determine the probability of a failure over time for the selected root cause for a particular device, service 106, and/or other entity. Because the failure estimator can be obtained in additional and/or alternative manners, it should be understood that this example is illustrative, and therefore should not be construed as being limiting in any way.

From operation 210, the method 200 can proceed to operation 212. At operation 212, the server computer 114 can determine a distribution based on the failure estimator determined in operation 210. Thus, operation 212 can correspond to the server computer 114 identifying a best-fit distribution for the failure estimator from multiple statistical distributions. It should be understood that this example is illustrative, and therefore should not be construed as being limiting in any way.

From operation 212, the method 200 can proceed to operation 214. At operation 214, the server computer 114 can determine if another data partition exists for analysis. It can be appreciated from the above description that because operation 214 relates to data partitions based on root causes (of failures), that operation 214 can be performed with respect to the failure data set 120 and not the inventory data set 122. It should be understood that this example is illustrative, and therefore should not be construed as being limiting in any way.

As noted above with reference to operation 208, the server computer 114 can be configured to select a first data partition based on a particular root cause in operation 208. Thus, operation 214 can correspond to the server computer 114 determining if any more root causes have been identified in the bound data sets for consideration. Thus, the server computer 114 can track a number of iterations of operations 208-214 and determine, in operation 214, if all root causes have been considered or whether additional data partitions associated with remaining root causes exist. Because the determination of operation 214 can be made in additional and/or alternative manners, it should be understood that this example is illustrative, and therefore should not be construed as being limiting in any way.

If the server computer 114 determines, in operation 214, that another partition exists for analysis, the method 200 can return to operation 208, and the server computer 114 can select another data partition (e.g., another root cause for filtering the bound data sets). Thus, operations 208-214 can be iterated until the server computer 114 determines, in any iteration of operation 214, that no additional partition exists for analysis. If the server computer 114 determines, in any iteration of operation 214, that no additional partition exists for analysis, the method 200 can proceed to operation 216.

At operation 216, the server computer 114 can output one or more failure models such as the failure models 124 and one or more graphical representations such as the graphical representations 130. In some embodiments, though not separately shown in FIG. 2, the server computer 114 can receive a request such as the request 128 for the graphical representations 130, and the server computer 114 can respond to the request 128 with the graphical representations 130. It should be understood that this example is illustrative, and therefore should not be construed as being limiting in any way.

The failure models 124 output in operation 216 can include the best-fit distribution and parameters for each of the root causes considered over one or more iterations of operations 208-214. Thus, it can be appreciated that in various embodiments of the concepts and technologies disclosed herein, operation 216 can correspond to the server computer 114 outputting multiple distributions with multiple sets of parameters as the failure models 124. Thus, in some embodiments of operation 216, the server computer 114 can provide failure models 124 for an entire service 106 (e.g., over multiple devices and/or users), for a particular piece of hardware (e.g., the customer premises equipment 102), or the like. It should be understood that this example is illustrative, and therefore should not be construed as being limiting in any way.

From operation 216, the method 200 can proceed to operation 218. At operation 218, the server computer 114 can determine if a service level agreement should be updated. In operation 218, the server computer 114 can consider the failure models 124 and determine, based on the failure models 124, if any service 106, device hosting, accessing, or using the service 106, customer premises equipment 102, or other device or entity should have a service level agreement modified based on an expected failure. Thus, operation 218 can correspond to the server computer 114 applying one or more failure models 124 to a service 106, the customer premises equipment 102, and/or other devices or entities to determine if a failure is expected soon (e.g., within a defined time period), or the like. For example, if a failure model 124 shows a distribution with a mean of one thousand hours between or to a failure, and if a service 106 or component thereof has been operating for over one thousand hours since a failure or installation, the server computer 114 can determine that a failure of that service 106 is imminent in operation 218, and that an associated service level agreement should therefore be modified to reduce liability for the service provider (e.g., liability for failing to meet a QoS specified in the service level agreement, or the like). Because the server computer 114 can determine that a service level agreement should be modified for additional and/or alternative reasons, it should be understood that this example is illustrative, and therefore should not be construed as being limiting in any way.

If the server computer 114 determines, in operation 218, that a service level agreement should be updated, the method 200 can proceed to operation 220. At operation 220, the server computer 114 can trigger an update to one or more service level agreements. In some embodiments, for example, the server computer 114 can be configured to generate one or more service level agreement updates 134 and/or to deliver the service level agreement updates 134 to the affected service(s) 106.

In some other embodiments, the server computer 114 can provide the failure models 124 to one or more service level agreement management entities 132, and the service level agreement management entity 132 can be configured to generate the one or more service level agreement updates 134. The service level agreement management entity 132 can be configured to provide the service level agreement updates 134 to the services 106 and/or components thereof, in some embodiments. Because the service level agreement updates 134 can be generated and/or delivered in additional and/or alternative manners, it should be understood that the above examples are illustrative, and therefore should not be construed as being limiting in any way.

In some embodiments of operation 220, the server computer 114 can apply various business service level agreement requirements to the failure models 124 to identify one or more service level agreement changes that should be made. In some embodiments, these changes may be made to reduce liability, as noted above, to improve a customer's perceived quality of experience, and/or for other reasons. Because the determination of operation 220 can be made in a variety of manners, it should be understood that these examples are illustrative, and therefore should not be construed as being limiting in any way.

From operation 218, the method 200 can proceed to operation 222. The method 200 also can proceed to operation 222 from operation 218 if the server computer 114 determines, in operation 218, that a service level agreement should not be updated. At operation 222, the method 200 can end.

Figure 3A:
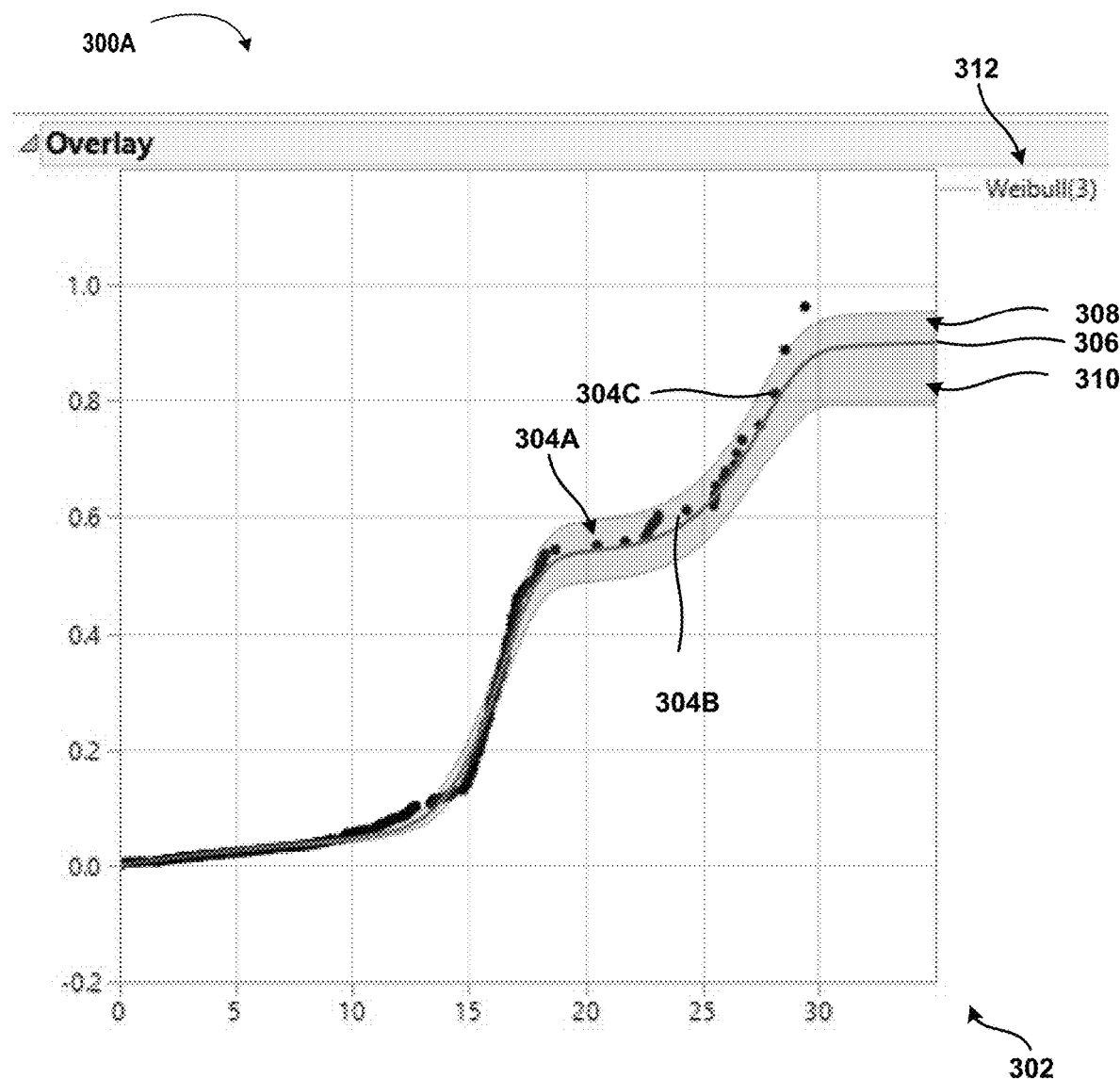
FIGS. 3A-3C are user interface diagrams showing various screen displays generated by a service level agreement management service, according to some illustrative embodiments of the concepts and technologies described herein.
Figure 3B:
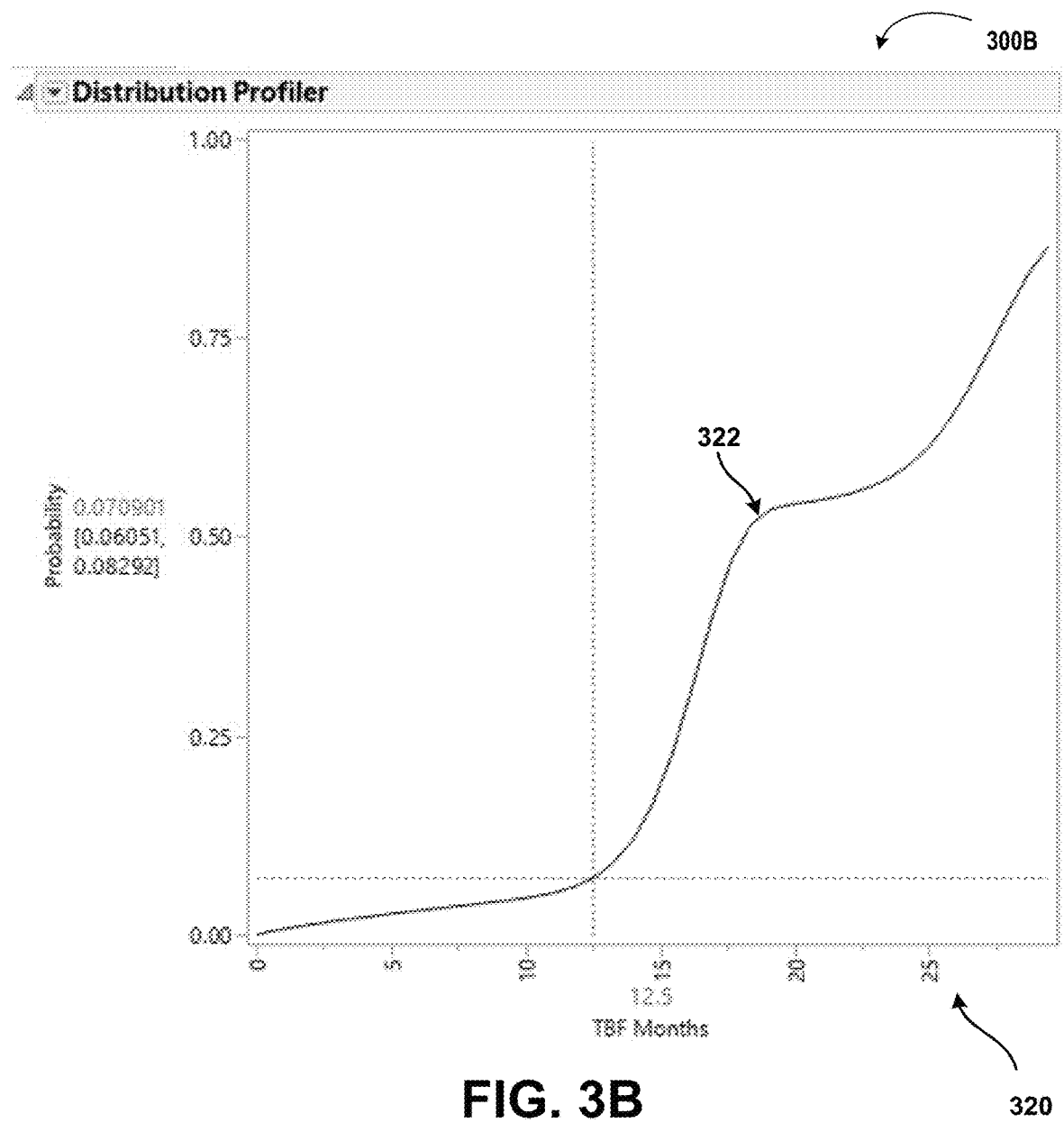
Figure 3C:
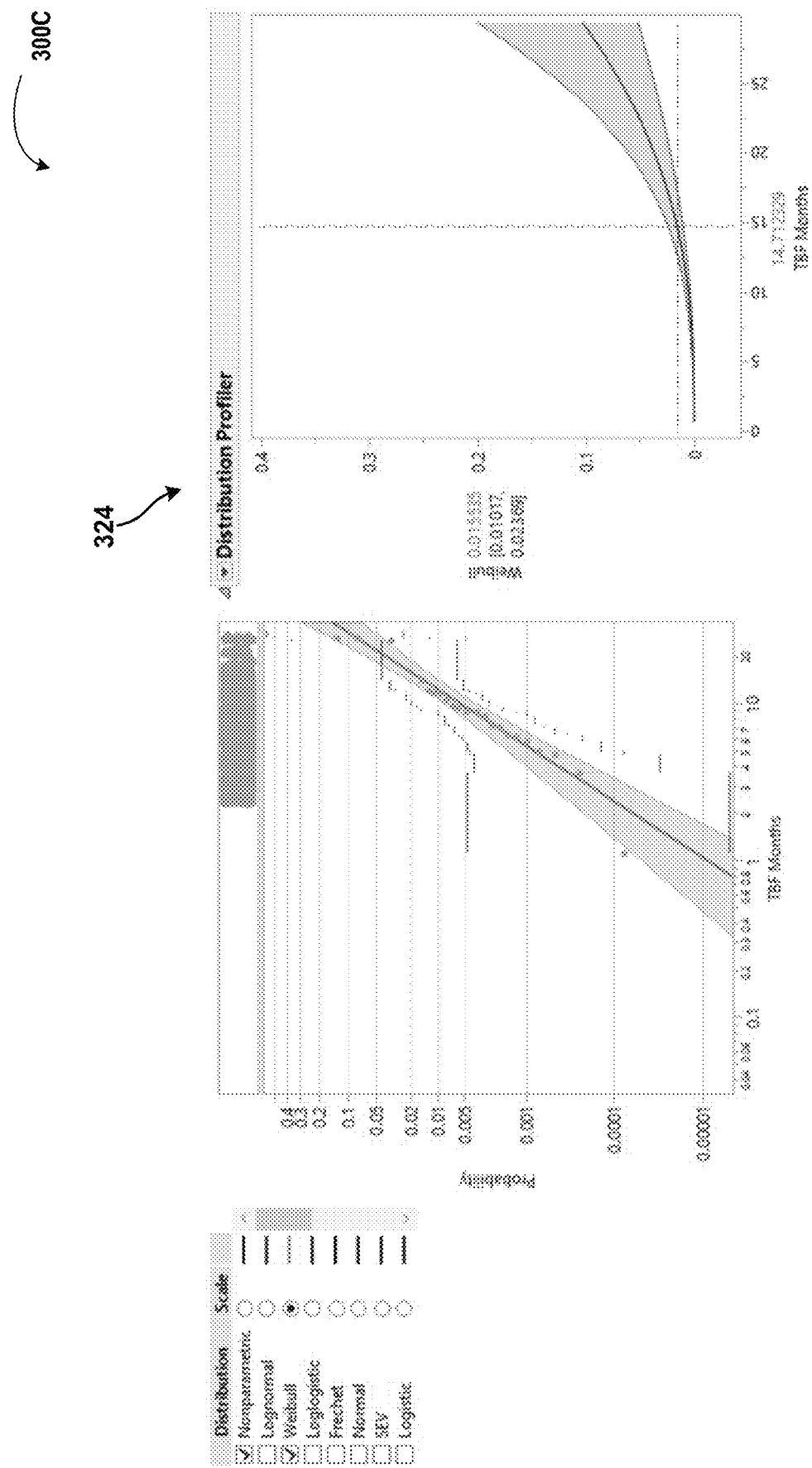

FIGS. 3A-3C are user interface ("UI") diagrams showing aspects of UIs for using and/or interacting with the service level agreement management service 112, according to some illustrative embodiments. FIG. 3A shows an illustrative screen display 300A. According to some embodiments of the concepts and technologies described herein, the screen display 300A can be generated by a device such as the user device 126 via interactions with the service level agreement management service 112. In particular, according to various embodiments, the user device 126 can generate the screen display 300A based on the graphical representations 130 obtained from the service level agreement management service 112. Because the screen display 300A can be generated based on other information and/or data, it should be understood that this example is illustrative, and therefore should not be construed as being limiting in any way. Furthermore, it should be appreciated that the UI diagram illustrated in FIG. 3A is illustrative of one contemplated example of the UIs that can be generated and/or displayed in accordance with the concepts and technologies disclosed herein, and therefore should not be construed as being limiting in any way.

It can be appreciated with reference to FIG. 3A that the screen display 300A can include representations and/or depictions of statistical equations; look-up tables to describe the continuous function; and/or discrete lookup capabilities (e.g., probability of a failure over time). Thus, it should be understood that the UI diagram shown in FIG. 3A (and/or other FIGURES) may be interactive and may be used to determine values (e.g., a probability of a failure at a particular time) and not merely to depict an associated statistical distribution or the like. It should be understood that this example is illustrative, and therefore should not be construed as being limiting in any way.

According to various embodiments, the screen display 300A can be presented, for example, in response to the user device 126 sending a request 128 to the server computer 114, and the user device 126 receiving the graphical representations 130 from the server computer 114. Because the screen display 300A illustrated in FIG. 3A can be displayed at additional and/or alternative times, it should be understood that these examples are illustrative and therefore should not be construed as being limiting in any way.

The screen display 300A can include various menus and/or menu options (not shown in FIG. 3A). The screen display 300A also can include a distribution fit window 302. The distribution fit window 302 can be configured to present, to a viewer or user (e.g., the user of the user device 126), a graph showing failures of a particular service 106, customer premises equipment 102, other device, and/or entity over time. As shown in FIG. 3A, the distribution fit window 302 can include representations 304A-C of specific failures and their associated time values (on the x axis) and a cumulative probability (y axis) of the failures occurring at the associated time.

For example, the representation 304A is illustrated as occurring at a time value of twenty (e.g., twenty months from the last failure or installation; twenty hours from the last failure or installation; twenty minutes from the last failure or installation, etc.) and having a cumulative probability of approximately 0.55. While the illustrated embodiment shows time in terms of months, it should be understood that this example is illustrative and should not be construed as being limiting in any way. In particular, other time units are possible and are contemplated such as, for example, milliseconds, seconds, minutes, hours, days, weeks, etc. Similarly, the representation 304B is illustrated as occurring at a time value of about twenty four (e.g., twenty four months from the last failure or installation; twenty four hours from the last failure or installation; twenty four minutes from the last failure or installation, etc.) and having a cumulative probability of approximately 0.60.

Finally, the representation 304C is illustrated as occurring at a time value of about twenty eight (e.g., twenty eight months from the last failure or installation; twenty eight hours from the last failure or installation; twenty eight minutes from the last failure or installation, etc.) and having a cumulative probability of approximately 0.82. It should be understood that these examples are illustrative, and therefore should not be construed as being limiting in any way.

As shown in FIG. 3A, the distribution fit window 302 also can represent the fit distribution by including a distribution curve 306, a first region 308 corresponding to an upper confidence interval, and a second region 310 corresponding to a lower confidence interval. In the example embodiment, the distribution fit window 302 also includes an indicator 312 that can provide a readable indicator that identifies the best-fit distribution and an associated parameter. It should be understood that this example is illustrative, and therefore should not be construed as being limiting in any way. Because additional or alternative graphical elements can be included in the distribution fit window 302, it should be understood that the example embodiment shown in FIG. 3A is illustrative and therefore should not be construed as being limiting in any way.

FIG. 3B shows an illustrative screen display 300B. According to some embodiments of the concepts and technologies described herein, the screen display 300B can be generated by a device such as the user device 126 via interactions with the service level agreement management service 112. In particular, according to various embodiments, the user device 126 can generate the screen display 300B based on the graphical representations 130 obtained from the service level agreement management service 112. Because the screen display 300B can be generated based on other information and/or data, it should be understood that this example is illustrative, and therefore should not be construed as being limiting in any way. Furthermore, it should be appreciated that the UI diagram illustrated in FIG. 3B is illustrative of one contemplated example of the UIs that can be generated and/or displayed in accordance with the concepts and technologies disclosed herein, and therefore should not be construed as being limiting in any way.

According to various embodiments, the screen display 300B can be presented, for example, in response to the user device 126 sending a request 128 to the server computer 114, and the user device 126 receiving the graphical representations 130 from the server computer 114. Because the screen display 300B illustrated in FIG. 3B can be displayed at additional and/or alternative times, it should be understood that these examples are illustrative and therefore should not be construed as being limiting in any way.

The screen display 300B can include various menus and/or menu options (not shown in FIG. 3B). The screen display 300B also can include a failure estimator window 320. The failure estimator window 320 can be configured to present, to a viewer or user (e.g., the user of the user device 126), a representation of the failure estimator illustrated and described herein for a particular service 106, customer premises equipment 102, other device, and/or entity over time. As shown in FIG. 3B, the failure estimator window 320 can depict probability of a failure at a particular time and/or a time associated with a particular probability. In the example embodiment, twelve and a half months have passed since the installation of a particular service 106, customer premises equipment 102, device accessing the service 106 and/or customer premises equipment 102, etc. It should be understood that this example is illustrative, and therefore should not be construed as being limiting in any way.

The failure estimator window 320 therefore can show the probability of an imminent failure based on the time lapsed (twelve and half months). As shown in FIG. 3B, the probability of an imminent failure at twelve and a half months for the failure estimator as represented in the fit distribution shown in FIG. 3A is approximately 0.070901, as indicated generally at reference numeral 322. It should be understood that this example is illustrative, and therefore should not be construed as being limiting in any way.

Thus, it can be appreciated that the failure estimator window can be used to determine the probability of a failure at a particular time, and therefore can be used to view and/or provide functionality associated with the failure models 124 as set forth herein. It should be understood that this example is illustrative, and therefore should not be construed as being limiting in any way. Because additional or alternative graphical elements can be included in the failure estimator window 320, it should be understood that the example embodiment shown in FIG. 3B is illustrative and therefore should not be construed as being limiting in any way.

FIG. 3C shows an illustrative screen display 300C. The screen display 300C can include various menus and/or menu options (not shown in FIG. 3C). The screen display 300C also can include additional embodiments of a failure estimator window 324. The failure estimator window 324 can be configured to present, to a viewer or user (e.g., the user of the user device 126), a representation of the failure estimator illustrated and described herein for a particular service 106, customer premises equipment 102, other device, and/or entity over time. Because the functionality of the failure estimator window 324 has already been described, additional details of this embodiment are not provided here. It should be understood that this example is illustrative, and therefore should not be construed as being limiting in any way. Because additional or alternative graphical elements can be included in the failure estimator window 324, it should be understood that the example embodiment shown in FIG. 3C is illustrative and therefore should not be construed as being limiting in any way.

Figure 4:
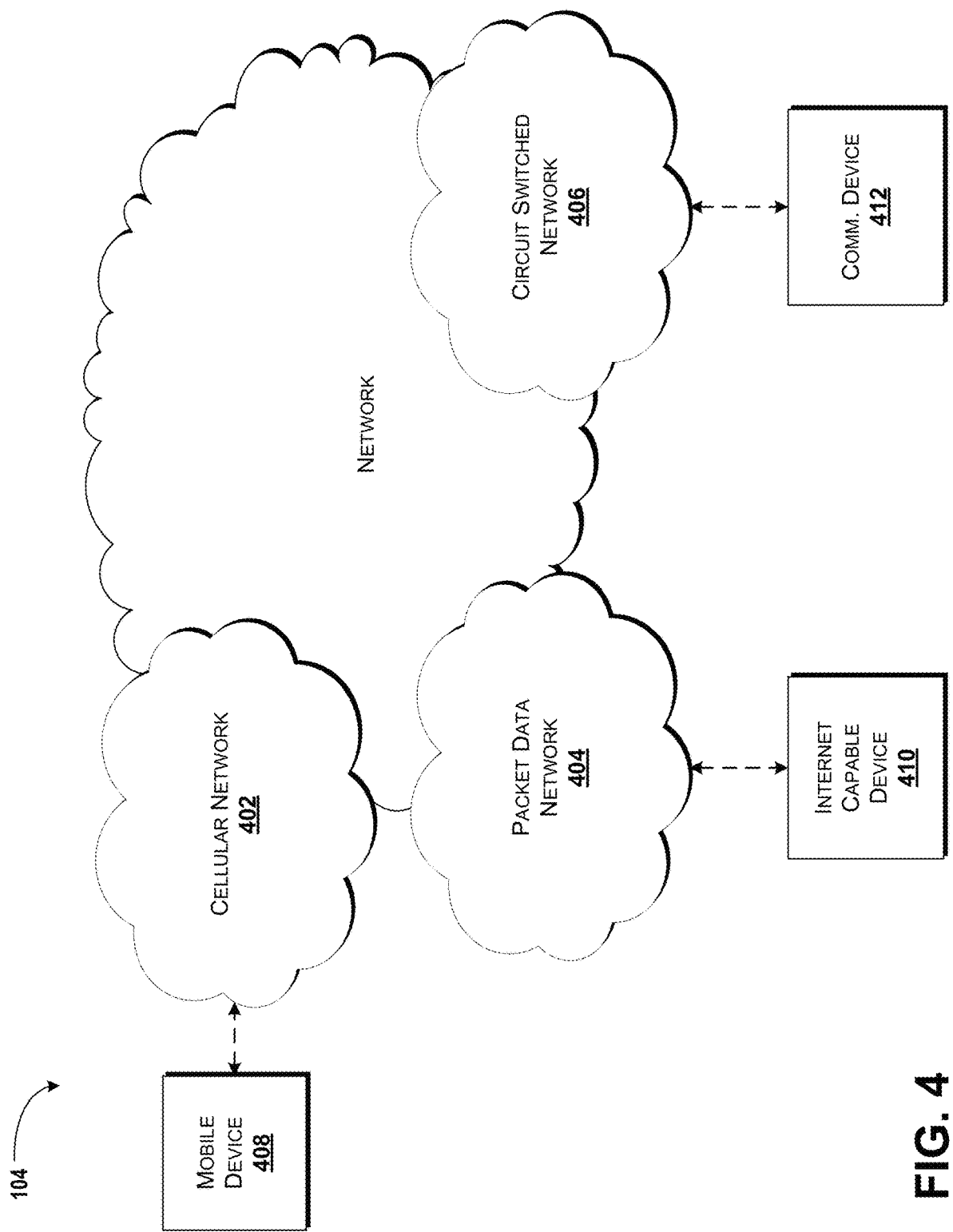
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards, 5G mobile communications standards, other mobile communications standards, and evolved and future mobile communications standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
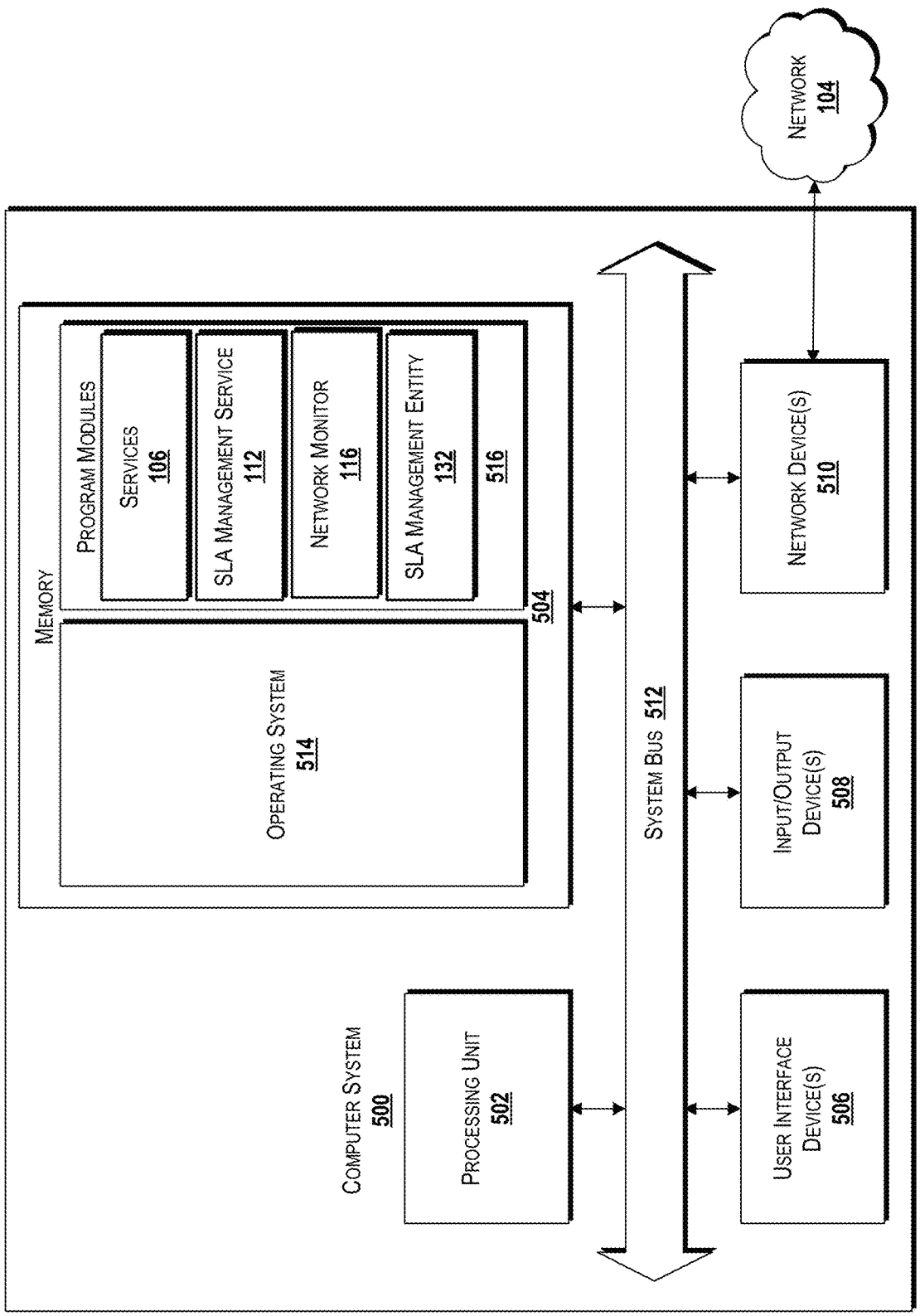
FIG. 5 is a block diagram illustrating an example computer system configured to provide a service level agreement management service, according to some illustrative embodiments of the concepts and technologies described herein.

FIG. 5 is a block diagram illustrating a computer system 500 configured to provide the functionality described herein for a service level agreement management service, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 can include the services 106, the service level agreement management service 112, the network monitor 116, the service level agreement management entity 132, and/or the like. These and/or other programs can be embodied in computer-readable media containing instructions that, when executed by the processing unit 502, perform one or more of the methods 200 described in detail above with respect to FIG. 2 and/or other functionality as illustrated and described herein. It can be appreciated that, at least by virtue of the instructions embodying the methods 200 and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store the network data 118, the failure data set 120, the inventory data set 122, the failure models 124, the service level agreement updates 134, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
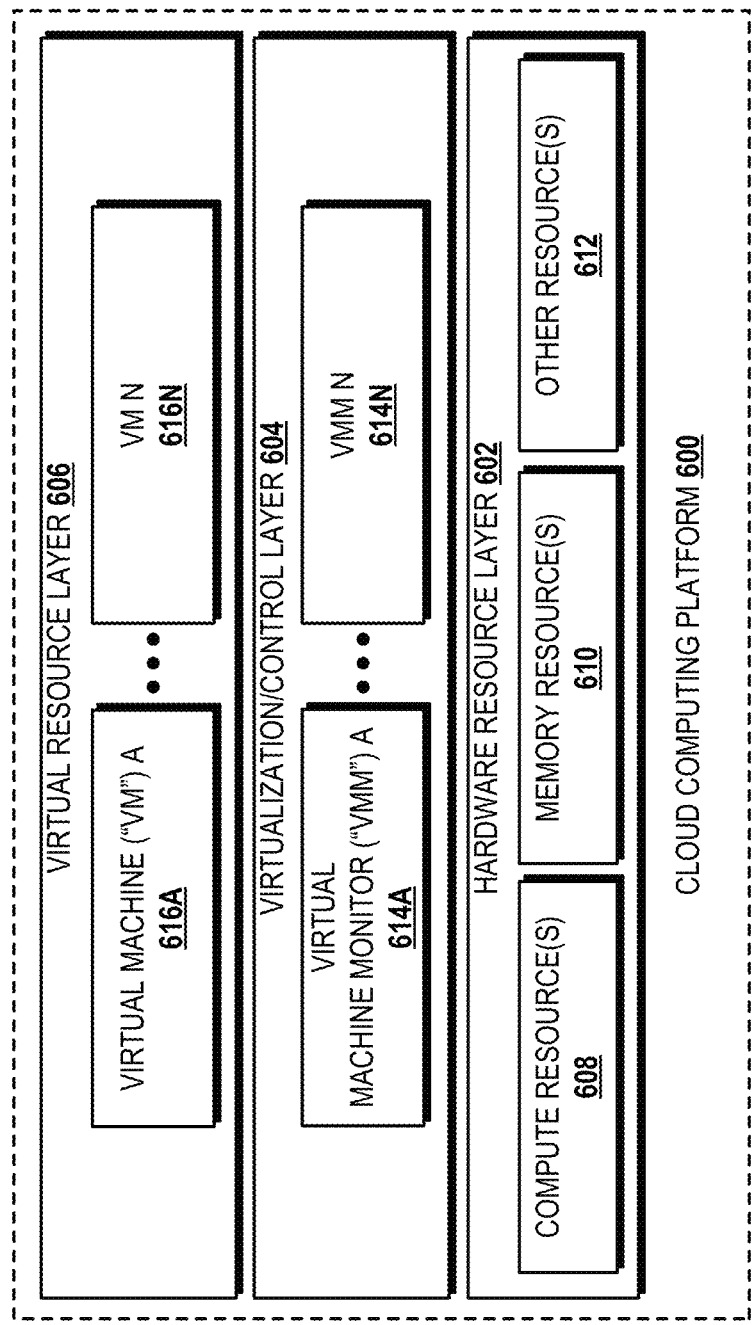
FIG. 6 is a diagram illustrating a computing environment capable of implementing aspects of the concepts and technologies disclosed herein, according to some illustrative embodiments of the concepts and technologies described herein.

FIG. 6 illustrates an illustrative architecture for a cloud computing platform 600 that can be capable of executing the software components described herein for providing a service level agreement management service 112 and/or for interacting with the service level agreement management service 112. Thus, it can be appreciated that in some embodiments of the concepts and technologies disclosed herein, the cloud computing platform 600 illustrated in FIG. 6 can be used to provide the functionality described herein with respect to the customer premises equipment 102, the services 106, the devices 108, the server computer 114, the network monitor 116, the user device 126, the service level agreement management entity 132, combinations thereof, or the like.

The cloud computing platform 600 thus may be utilized to execute any aspects of the software components presented herein. Thus, according to various embodiments of the concepts and technologies disclosed herein, the customer premises equipment 102, the services 106, the devices 108, the service level agreement management service 112, the server computer 114, the network monitor 116, the user device 126, the service level agreement management entity 132, and/or other devices can be implemented, at least in part, on or by elements included in the cloud computing platform 600 illustrated and described herein. Those skilled in the art will appreciate that the illustrated cloud computing platform 600 is a simplification of but only one possible implementation of an illustrative cloud computing platform, and as such, the illustrated cloud computing platform 600 should not be construed as being limiting in any way.

In the illustrated embodiment, the cloud computing platform 600 can include a hardware resource layer 602, a virtualization/control layer 604, and a virtual resource layer 606. These layers and/or other layers can be configured to cooperate with each other and/or other elements of a cloud computing platform 600 to perform operations as will be described in detail herein. While connections are shown between some of the components illustrated in FIG. 6, it should be understood that some, none, or all of the components illustrated in FIG. 6 can be configured to interact with one another to carry out various functions described herein. In some embodiments, the components are arranged so as to communicate via one or more networks such as, for example, the network 104 illustrated and described hereinabove (not shown in FIG. 6). Thus, it should be understood that FIG. 6 and the following description are intended to provide a general understanding of a suitable environment in which various aspects of embodiments can be implemented, and should not be construed as being limiting in any way.

The hardware resource layer 602 can provide hardware resources. In the illustrated embodiment, the hardware resources can include one or more compute resources 608, one or more memory resources 610, and one or more other resources 612. The compute resource(s) 608 can include one or more hardware components that can perform computations to process data, and/or to execute computer-executable instructions of one or more application programs, operating systems, services, and/or other software including, but not limited to, the customer premises equipment 102, the services 106, the devices 108, the server computer 114, the network monitor 116, the user device 126, the service level agreement management entity 132, and/or other devices or entities illustrated and described herein.

According to various embodiments, the compute resources 608 can include one or more central processing units ("CPUs"). The CPUs can be configured with one or more processing cores. In some embodiments, the compute resources 608 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 608 can include one or more discrete GPUs. In some other embodiments, the compute resources 608 can include one or more CPU and/or GPU components that can be configured in accordance with a co-processing CPU/GPU computing model. Thus, it can be appreciated that in some embodiments of the compute resources 608, a sequential part of an application can execute on a CPU and a computationally-intensive part of the application can be accelerated by the GPU. It should be understood that this example is illustrative, and therefore should not be construed as being limiting in any way.

In some embodiments, the compute resources 608 also can include one or more system on a chip ("SoC") components. It should be understood that an SoC component can operate in association with one or more other components as illustrated and described herein, for example, one or more of the memory resources 610 and/or one or more of the other resources 612. In some embodiments in which an SoC component is included, the compute resources 608 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 608 can be or can include one or more hardware components arranged in accordance with an ARM architecture, available for license from ARM HOLDINGS of Cambridge, United Kingdom. Alternatively, the compute resources 608 can be or can include one or more hardware components arranged in accordance with an x86 architecture, such as an architecture available from INTEL CORPORATION of Mountain View, Calif., and others. Those skilled in the art will appreciate the implementation of the compute resources 608 can utilize various computation architectures and/or processing architectures. As such, the various example embodiments of the compute resources 608 as mentioned hereinabove should not be construed as being limiting in any way. Rather, implementations of embodiments of the concepts and technologies disclosed herein can be implemented using compute resources 608 having any of the particular computation architecture and/or combination of computation architectures mentioned herein as well as other architectures.

Although not separately illustrated in FIG. 6, it should be understood that the compute resources 608 illustrated and described herein can host and/or execute various services, applications, portals, and/or other functionality illustrated and described herein. Thus, the compute resources 608 can host and/or can execute the service level agreement management service 112, the network monitor 116, the user device 126, the service level agreement management entity 132, and/or other applications or services illustrated and described herein.

The memory resource(s) 610 can include one or more hardware components that can perform or provide storage operations, including temporary and/or permanent storage operations. In some embodiments, the memory resource(s) 610 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 608, subject to the definition of "computer storage media" provided above (e.g., as excluding waves and signals per se and/or communication media as defined in this application).

Although not illustrated in FIG. 6, it should be understood that the memory resources 610 can host or store the various data illustrated and described herein including, but not limited to, the network data 118, the failure data set 120, the inventory data set 122, the failure models 124, the request 128, the graphical representations 130, the service level agreement updates 134, and/or other data, if desired. It should be understood that this example is illustrative, and therefore should not be construed as being limiting in any way.

The other resource(s) 612 can include any other hardware resources that can be utilized by the compute resources(s) 608 and/or the memory resource(s) 610 to perform operations. The other resource(s) 612 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 602 can be virtualized by one or more virtual machine monitors ("VMMs") 614A-614N (also known as "hypervisors;" hereinafter "VMMs 614"). The VMMs 614 can operate within the virtualization/control layer 604 to manage one or more virtual resources that can reside in the virtual resource layer 606. The VMMs 614 can be or can include software, firmware, and/or hardware that alone or in combination with other software, firmware, and/or hardware, can manage one or more virtual resources operating within the virtual resource layer 606.

The virtual resources operating within the virtual resource layer 606 can include abstractions of at least a portion of the compute resources 608, the memory resources 610, the other resources 612, or any combination thereof. These abstractions are referred to herein as virtual machines ("VMs"). In the illustrated embodiment, the virtual resource layer 606 includes VMs 616A-616N (hereinafter "VMs 616").

Based on the foregoing, it should be appreciated that systems and methods for a service level agreement management service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
obtaining network data that relates to a service, wherein the network data represents a service level agreement associated with the service,
creating, based on the network data, a failure data set and an inventory data set, wherein the inventory data set describes a component of the service and time data that describes a time since an installation of the component of the service, and wherein the component of the service has not failed during the time since installation,
binding the failure data set to the inventory data set to obtain an intermediate data set,
selecting a data partition of the intermediate data set based on a failure root cause,
determining, for the data partition, a failure estimator that estimates a probability of failure over time for the service due to the failure root cause,
determining, for the failure estimator, a best-fit probability distribution,
outputting a failure model that represents failures over time for the service due to the failure root cause, and
determining, based on the failure model, if the service level agreement should be updated.

2. The system of claim 1, wherein the computer-executable instructions, when executed by the processor, cause the processor to perform operations further comprising:
receiving, from a user device, a request for a graphical representation of the failure model; and
providing, to the user device and in response to the request, the graphical representation of the failure model.

3. The system of claim 1, wherein the computer-executable instructions, when executed by the processor, cause the processor to perform operations further comprising:
triggering creation of a service level agreement update and delivery of the service level agreement to the service.

4. The system of claim 1, wherein the network data is obtained from a network monitor that is configured to monitor performance of the service and a customer premises equipment.

5. The system of claim 1, wherein the failure data set describes a failure of the component of the service and time data that describes a time between a first failure of the service and a second failure of the service.

6. The system of claim 1, wherein binding the failure data set to the inventory data set comprises horizontally binding the failure data set to the inventory data set to obtain the intermediate data set having a plurality of records.

7. The system of claim 6, wherein each of the plurality of records identifies an associated component of the service and specifies an associated time value associated with the associated component of the service, and wherein the associated time value comprises one of an associated time between failures for the associated component of the service or an associated time since installation of the associated component of the service.

8. A method comprising:
obtaining, at a computer comprising a processor, network data that relates to a service, wherein the network data represents a service level agreement associated with the service;
creating, by the processor and based on the network data, a failure data set and an inventory data set, wherein the inventory data set describes a component of the service and time data that describes a time since an installation of the component of the service, and wherein the component of the service has not failed during the time since installation;
binding, by the processor, the failure data set to the inventory data set to obtain an intermediate data set;
selecting, by the processor, a data partition of the intermediate data set based on a failure root cause;
determining, by the processor and for the data partition, a failure estimator that estimates a probability of failure over time for the service due to the failure root cause;
determining, by the processor and for the failure estimator, a best-fit probability distribution;
outputting, by the processor, a failure model that represents failures over time for the service due to the failure root cause; and
determining, by the processor and based on the failure model, if the service level agreement should be updated.

9. The method of claim 8, further comprising:
receiving, from a user device, a request for a graphical representation of the failure model; and
providing, to the user device and in response to the request, the graphical representation of the failure model.

10. The method of claim 8, further comprising:
triggering creation of a service level agreement update and delivery of the service level agreement to the service.

11. The method of claim 8, wherein the failure data set describes a failure of the component of the service and time data that describes a time between a first failure of the service and a second failure of the service.

12. The method of claim 8, wherein binding the failure data set to the inventory data set comprises horizontally binding the failure data set to the inventory data set to obtain the intermediate data set having a plurality of records.

13. The method of claim 12, wherein each of the plurality of records identifies an associated component of the service and specifies an associated time value associated with the associated component of the service, and wherein the associated time value comprises one of an associated time between failures for the associated component of the service or an associated time since installation of the associated component of the service.

14. A computer storage medium having computer-executable instructions stored thereon that, when executed by a processor, cause the processor to perform operations comprising:
    obtaining network data that relates to a service, wherein the network data represents a service level agreement associated with the service;
    creating, based on the network data, a failure data set and an inventory data set, wherein the inventory data set describes a component of the service and time data that describes a time since an installation of the component of the service, and wherein the component of the service has not failed during the time since installation;
    binding the failure data set to the inventory data set to obtain an intermediate data set;
    selecting a data partition of the intermediate data set based on a failure root cause;
    determining, for the data partition, a failure estimator that estimates a probability of failure over time for the service due to the failure root cause;
    determining, for the failure estimator, a best-fit probability distribution;
    outputting a failure model that represents failures over time for the service due to the failure root cause; and
    determining, based on the failure model, if the service level agreement should be updated.

15. The computer storage medium of claim 14, wherein the computer-executable instructions, when executed by the processor, cause the processor to perform operations further comprising:
    receiving, from a user device, a request for a graphical representation of the failure model; and
    providing, to the user device and in response to the request, the graphical representation of the failure model.

16. The computer storage medium of claim 14, wherein the computer-executable instructions, when executed by the processor, cause the processor to perform operations further comprising:
    triggering creation of a service level agreement update and delivery of the service level agreement to the service.

17. The computer storage medium of claim 14, wherein the network data is obtained from a network monitor that is configured to monitor performance of the service and a customer premises equipment.

18. The computer storage medium of claim 14, wherein the failure data set describes a failure of the component of the service and time data that describes a time between a first failure of the service and a second failure of the service.

19. The computer storage medium of claim 14, wherein binding the failure data set to the inventory data set comprises horizontally binding the failure data set to the inventory data set to obtain the intermediate data set having a plurality of records.

20. The computer storage medium of claim 19, wherein each of the plurality of records identifies an associated component of the service and specifies an associated time value associated with the associated component of the service, and wherein the associated time value comprises one of an associated time between failures for the associated component of the service or an associated time since installation of the associated component of the service.

* * * * *